United States Patent [19]

Parikh

[11] 4,404,864
[45] Sep. 20, 1983

[54] VARIABLE SPEED DRIVING MECHANISM

[75] Inventor: Bhupendra A. Parikh, Parma, Ohio

[73] Assignee: MTD Products Inc., Cleveland, Ohio

[21] Appl. No.: 199,817

[22] Filed: Oct. 23, 1980

[51] Int. Cl.³ .............................................. F16H 15/08
[52] U.S. Cl. ........................................................ 74/197
[58] Field of Search ............................ 74/194, 197, 199

[56] References Cited

U.S. PATENT DOCUMENTS

| | | | |
|---|---|---|---|
| 974,308 | 11/1910 | Swift | 74/194 |
| 1,143,048 | 6/1915 | Hunt | 74/194 |
| 3,580,351 | 5/1971 | Mollen | 74/194 |
| 3,678,770 | 7/1972 | Enters et al. | 74/197 |
| 4,265,133 | 5/1981 | Van Der Meulen et al. | 74/194 |

Primary Examiner—Kenneth Dorner
Attorney, Agent, or Firm—Woodling, Krost and Rust

[57] ABSTRACT

A variable speed mechanism in which a friction wheel (29) is movable in a plane normal to the plane of a driving wheel (20) and in frictional engagement therewith to obtain a driving of the friction wheel at a speed and in a direction dependent upon the location of the frictional engagement of the friction wheel (29) with the driving wheel (20), the driving wheel (20) being rotated about a non-rotating pintle (22) which engages the rim (29A) of the friction wheel (29) when located at the axis of the driving wheel (20).

3 Claims, 4 Drawing Figures

VARIABLE SPEED DRIVING MECHANISM

FIELD TO WHICH INVENTION RELATES

My invention relates to a driving mechanism in which a variable speed is obtained by the periphery of a friction wheel frictionally engaging the flat face of a driving wheel to rotate the friction wheel upon rotation of the driving wheel, the plane of the friction wheel being normal to the plane of the driving wheel, the speed and direction of rotation of the friction wheel being dependent upon the distance of the location of the friction wheel from the axis of the driving wheel and the side of the location of the friction wheel relative to the axis of the driving wheel. The invention is useful for utilization in the driving mechanism in power-driven appliances of various kinds such as powered snow-throwers, and is here described in association with a snow-thrower by way of example.

BACKGROUND ART OF THE INVENTION

The related art background is generally known to the Applicant as those prior variable speed driving mechanisms in which variable driving speed is derived from the combination of a flat sided driving wheel frictionally engaged by a friction wheel disposed in a plane normal to the flat side of the driving wheel, the speed and direction of rotation of the friction wheel being dependent upon the location of the frictional engagement of the friction wheel with the flat side of the driving wheel relative to the axis of the driving wheel.

STATEMENT OF THE INVENTION

It is an object of the invention to provide that upon alignment of the plane of the friction wheel substantially with the axis of the driving wheel, the friction wheel is out of frictional engagement with the driving wheel to assure nonrotation of the friction wheel upon rotation of the driving wheel.

A further object of the invention is to assure nonrotation of a friction wheel upon movement of the friction wheel to selected locations relative to the axis of a driving wheel engageable by the friction wheel.

A further object is the provision of a unique and efficient mechanism for the driving of a driven part of an appliance, such as the supporting wheels of a snow thrower, whereby the driven part, such as said wheels, may be rotated at a speed and in a location dependent upon the location of a friction wheel relative to an engine driven driving wheel.

Another object is to assure that a friction wheel engageable with a driving wheel is not rotated upon selected positioning of the friction wheel relative to the axis of said driving wheel, to better control the operation of parts driven by the friction wheel.

Other objects and advantages may be observed from the following description of the invention in conjunction with the several drawings.

FIGURES OF THE DRAWINGS

Figure 1:
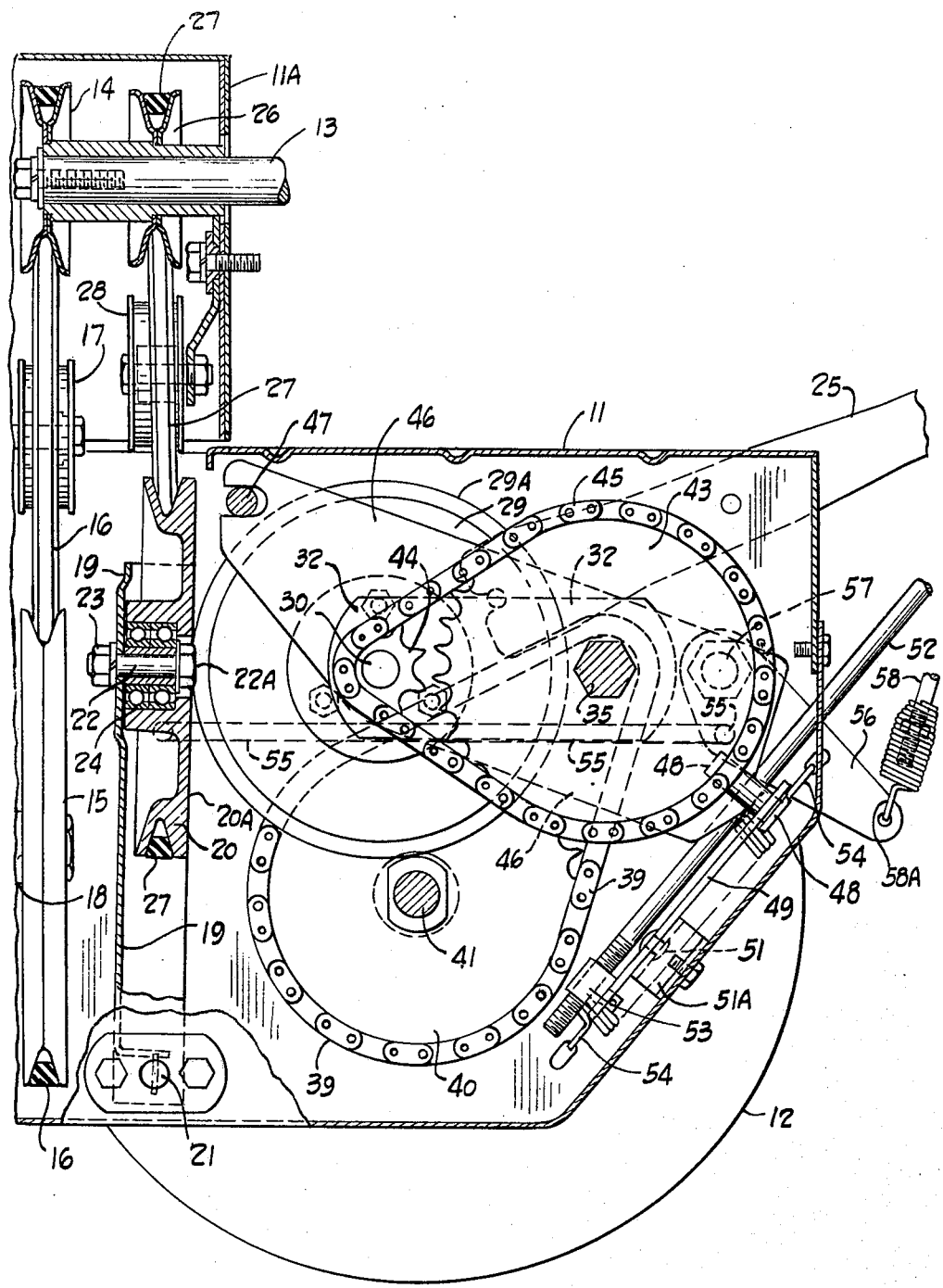
FIG. 1 is a vertical sectional view of a snow thrower housing containing a preferred form of my variable speed driving mechanism taken through the line 1—1 of FIG. 2, the parts being shown in clutching engagement.

The invention is shown in conjunction with a snow thrower for which it is particularly adapted for driving the wheels of the snow thrower in a direction and at a speed selected as desired. The housing of the snow thrower, illustrated by way of example, is denoted by the reference character 11. Protruding upwardly from the housing 11, as seen in FIG. 1, is a housing extension 11A.

One of the two wheels of the snow thrower to be driven by my mechanism is indicated by the reference character 12. A like wheel on the opposite side of the snow thrower in axial alignment with, and mounted on the same axle, is not shown.

Extending from an engine or motor such as an internal combustion engine or an electric motor mounted on the snow thrower, but not shown, is an engine-driven shaft 13 which suppliies the energy for the snow thrower. Non-rotatably mounted on the free end of shaft 13 is a pulley 14. A pulley 15 spaced from, and below, the pulley 14, is operatively connected by shaft 18 to the auger or snow impeller of the snow thrower. A belt 16 is reeved around pulleys 14 and 15 and is held in appropriate tension by an idler pulley 17. In this manner the auger or impeller of the snow thrower is powered by the engine through shaft 13, pulley 14, belt 16, pulley 15, and shaft 18.

Carried by the housing 11 on a rod 21 extending between the sides of the housing 11 is a plate or supporting structure 19 disposed in a generally upright manner. The mounting of the plate 19 on rod 21 is such that the plate 19 may pivotally be tilted on the axis of rod 21 between the position shown in FIGS. 1 and 2 and the position shown in FIG. 3.

Figure 2:
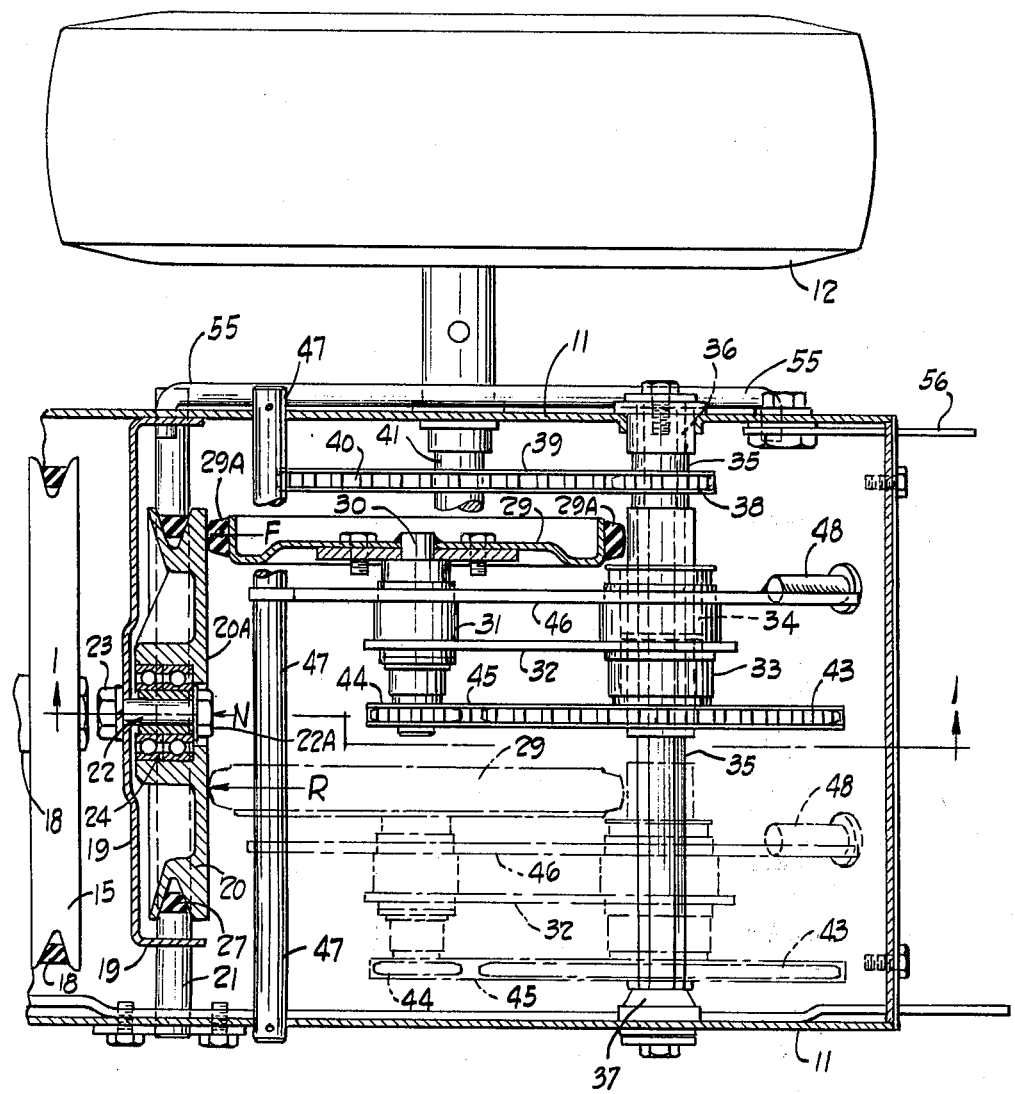
FIG. 2 is a horizontal sectional view of the snow thrower housing shown in FIG. 1, the plane of the sectional view in FIG. 2 being normal to the sectional view in FIG. 1, the parts being shown in clutched engagement.

The plate 19 may be manually tilted by the operator of the snow thrower by means of a rod 55 connected at one of its ends to the plate 19 at a side of the plate 19 at a level above the rod 21. This rod extends along the outer side of the housing 11 and along its side as shown in FIG. 2. The other end of rod 55 is connected by a lever arm 56 at a point intermediate of its ends. The lever arm 56 is pivotally connected by bolt 57 to the side of housing 11 to permit the lever arm 56 to swing.

The outer or free end of lever arm 56 is connected to spring 58A and rod 58 which is manipulated by the operator of the snow thrower from a position at the outer free ends of the handles 25 (only one of which is shown) extending rearwardly from the housing 11.

A coil spring 54 has one of its ends connected to lever arm 56 and the other end to side wall of housing 11 to bias lever arm 56 downwardly and hence, by way of rod 55, to tilt plate 19 forwardly. The operator upon pulling upwardly on spring 58A and rod 58 overcomes the bias of spring 54 and thus swings the plate 19 to tilt rearwardly to its position shown in FIGS. 1 and 2.

Firmly secured to plate 19 so as not to rotate on its own axis is a pintle member 22 which in the form shown is a bolt. This pintle member has a flat end surface 22A which in the form shown is the end flat surface of the bolt 22. A nut 23 on the forward end of bolt 22 firmly holds the bolt to plate 19 in a manner to prevent rotation of bolt 22 on its axis.

Mounted on the bolt 22 is a bearing assembly 24 of usual construction which permits the outer race of the assembly 24 to freely revolve around the bolt 22. A metal driving wheel 20 is mounted on the assembly 24 so that the driving wheel may freely revolve on the bolt 22. The driving wheel being carried by plate 19 swings forwardly and rearwardly upon the tilting of the plate 19 between the position shown in FIGS. 1 and 2 and its position shown in FIG. 3.

The driving wheel 20 has a grooved periphery so as to form a pulley. A belt 27 is reeved around the pulley formed by driving wheel 20 and a pulley 26 non-rotatively secured to the shaft 13 extending from the engine, not shown. An idler pulley 28 maintains required tension on the belt 27 and thus provides that driving wheel 20 is revolved by the pulley 26 and shaft 13.

The rearward side face of driving wheel 20 is flat to provide a flat side 20A extending in a plane across the driving wheel from edge to edge. This flat face 20A is interrupted adjacent the axis of the driving wheel 20 so as to accommodate the head of bolt 22. There is sufficient space between the head of the bolt and the driving wheel 20 at the flat side 22A so as to assure that the driving wheel may freely rotate on its axis without interference with the bolt head. The flat end surface 22A of the bolt head is slightly protruded from the plane of the flat side 20A of the driving wheel.

A friction wheel 29 is non-rotatably mounted on stub shaft 30 in a manner that rotation of the friction wheel rotates the stub shaft 30 on its axis. The peripheral edge or border of the friction wheel 29 is provided with a rim 29A, firmly secured thereto, which rim 29A is made of a rubber or rubber-like material which imparts a friction characteristic thereto, that is, the rim 29A resists sliding sliding and slipping when in tight engagement with another surface.

When the plate 19 is moved backward (by means of rod 55, lever arm 56, spring 58A and rod 58) the driving wheel 20 is carried backward with it to the position shown in FIGS. 1 and 2. This presses the flat side 20A, of metal driving wheel 20 back tightly against the outer surface of rim 29A of friction wheel 29. The coil spring 54 pulling down on lever arm 56 aids in urging the driving wheel 20 against the rim 29A when the tension of spring 58A on rod 58 is relaxed by the operator to allow the spring 54 to exert its biasing force.

The stub shaft 30 is carried by a bearing assembly that allows the stub shaft 30 and friction wheel 29 to freely rotate relative to the outer race of bearing assembly 31. The outer race or shell of the bearing assembly 31 is firmly secured to, and is carried by a plate 32 extending longitudinally of the housing 11. The other or rearward end of supporting plate 32 is secured to the outer shell of a barrel-like cylindrical supporting member 33.

This cylindrical supporting member 33 contains an inner sleeve or bearing 34 having two axially aligned parts extending into and held within the member 33. The inner surface of member 33 is cylindrical and the outer surface of sleeve or bearing 34 is cylindrical and complementing the inner surface of member 33 whereby the sleeve or bearing 34 may freely rotate within and relative to the member 33.

The inner surface of bearing or sleeve 34 is non-cylindrical and in the form shown this inner surface has a hexagonal cross-sectional shape. The inner surface of this bearing or sleeve 34 complements the outer surface of the driven shaft 35 having a hexagonal cross-section. The fit between the driven shaft 35 and bearing or sleeve 34 is such that the shaft 35 may freely rotate on its axis within the bearing or sleeve 34, and is also such that the supporting member 33 and sleeve 34 held within the supporting member 33 may freely slide longitudinally along the shaft 35.

The outer ends of driven shaft 35 are round or cylindrical in cross section, and these outer ends are carried in bearings, preferably plastic cylindrical bearings, 36 and 37 mounted on the opposite side walls of housing 11.

Secured to the sleeve or bearing 34 at an end of member 33 and slidable along the shaft 35 with the member 33 and sleeve 34 is a gear 43 which is thus non-rotatively carried whereby rotation of gear 43 rotates the shaft 35. The gear 43 is slidable along the shaft 35 with the member 33 and inner sleeve or bearing 34 while maintaining non-rotative engagement of gear 43 with shaft 35.

A gear 44 is non-rotatively mounted on the stub shaft 30 at its end opposite to the friction wheel 29, whereby rotation of shaft 30 by friction wheel 29 rotates the gear 44. A chain 45 reeved about, and enmeshed with, gears 44 and 43 provides that friction wheel 29, through shaft 30, gear 44, chain 45, and gear 43 rotates the driven shaft 35 on its axis.

Non-rotatively mounted on the driven hexagonal shaft 35, at its end closest to bearing 36, is a gear 38 so that rotation of shaft 35 rotates gear 38. A gear 40 is non-rotatively mounted on the axle 41 which carries the wheels 12 (only one of which is shown) on the opposite sides of the snow thrower. The wheels, non-rotatively carried by axle 41, are rotated, and thus the snow thrower is driven along a path, by rotation of the axle 41 and gear 40 through the chain 39 and gear 38 upon the rotation of shaft 35 on its axis.

A shifting bar or plate 46, spaced from and disposed parallel to, the supporting plate 32, is secured to both the bearing assembly 31 and the member or barrel 33. Both the shaft 30 and shaft 35 may rotate on their respective axes relative to the plate member 32 and shifting bar 46. The plate 32 and shifting bar together provide a carriage for supporting the bearing assembly 31 and the stub shaft and friction wheel 29 carried by the bearing assembly 31. The forward free end of shifting member 46 is notched and this notched end is supported on a rod 47 extending between and mounted to the opposite sides of the housing 11. The shifting member is slidable along the rod laterally of the snow thrower.

A pin or stud 48 in the form illustrated is welded to the rearward end portion of shifting member 46 and extends therefrom to protrude as a finger rearwardly and downwardly at an incline from a horizontal plane through the shifting bar 46. The rearward-most end of the pin 48 is headed or enlarged as illustrated. Movement of the pin 48 causes corresponding movement of the shifting bar 46 laterally of the snow thrower, that is along the shaft 35.

Figure 4:
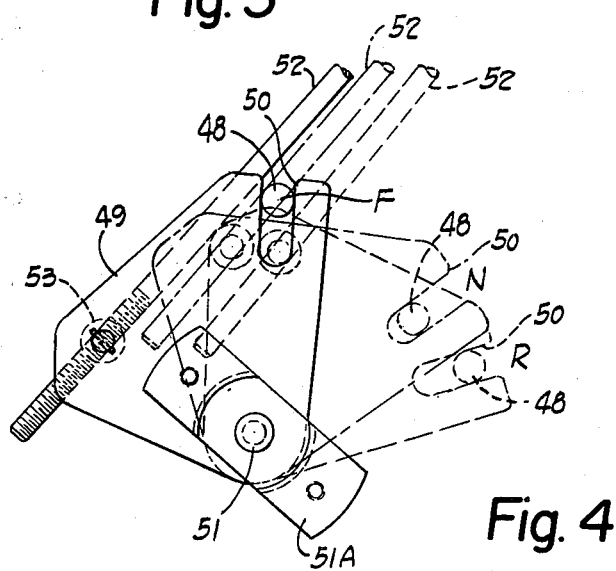
FIG. 4 is a detailed plan view of the portion of my mechanism used in shifting the carriage that changes the location of the friction wheel of my mechanism relative to the axis of the driving wheel.

An actuating plate or member 49 of a generally triangular shape shown in FIG. 4 is pivotally mounted by means of a pivotal mounting 51 on a bracket 51A to a rear wall of the housing 11 and disposed within the housing. The actuating member 49 may swing in an arc on pivot mounting 51 in a plane parallel to the rear wall of the housing 11 to which it is mounted. The actuating member 49 is provided with a notch or slot 50 extending in from its outer edge at a distance from the pivot mounting 51 as illustrated in FIG. 4. This notch accommodates the shank of the pin or stud 48 extending out from the shifting bar 46. The head or enlargement on the free end of the pin or stud 48 is disposed on the rearward side of the actuating plate or member 49.

An actuating rod 52, extending back alongside the handles 25 of the snow thrower to within reach of the operator of the snow thrower, has its lower end connected by means of a pivot pin mounting 53 to the actuating plate or member 49. The connection of rod 52 to connection 53 is adjustable by means of a threaded inter-fit between the connection 53 and rod 52.

Upon the actuating rod 52 being moved to where it is shown in full lines in FIG. 4, then the actuating plate is positioned to where it appears in full lines in FIG. 4. At this location the pin or stud 48 is in the notch 50 and this location is marked by the letter "F" (for "forward") in FIG. 4. Upon the operator pulling the rod 52 the actuating plate is swung (and forward travel speed of the snow thrower is gradually decreased) until the actuating plate 49 has pivotally swung to where it is shown in broken lines and the notch 50 has moved the pin 48 to the location marked "N" (for "neutral") in FIG. 4 (and the driven travel of the snow thrower has ceased). Upon the operator pulling the rod 52 still more, then the actuating plate 49 is pivotally swung (and direction of the driven travel of the snow thrower is gradually reversed) until the actuating plate 49 has pivotally swung to where it is shown in broken lines and the notch 50 has moved the pin 48 to the location marked "R" (for "reverse") in FIG. 4.

THE OPERATION OF THE MECHANISM

Upon spring 58A and the rod 58 being moved upwardly by the operator to tilt the lever arm 56 upwardly the plate or supporting structure 19, by means of rod 55, is tilted up and rearwardly to the position shown in FIGS. 1 and 2. This puts the mechanism in clutched condition, that is the driving wheel 20 rotated by the engine is put into driving engagement with the rim 29A of the friction wheel 29 as shown in FIGS. 1 and 2. By reason of the friction or non-sliding characteristics of the material of rim 29A engaging the flat side 20A of steel driving wheel 20, rotation of the wheel causes the friction wheel 29 to rotate.

Through the shafts, gears, chains and connections heretofore described, the friction wheel 29 rotates the wheels 12 of the snow thrower at a speed and in a direction (forward, neutral or reverse) which is dependent upon the location of the friction wheel 29 relative to the axis of the driving wheel. Upon the actuating plate 49 being swung to full forward position (as shown in full lines in FIG. 4) the friction wheel 29 is positioned by shifting bar 46 to its position shown in full lines in FIG. 2. In this location of the friction wheel 29, it is close to the circumferential boundary of the flat side 20A of driving wheel 20. This provides that the friction wheel is rotated at its maximum speed relative to the rotative speed of the driving wheel 20.

Figure 3:
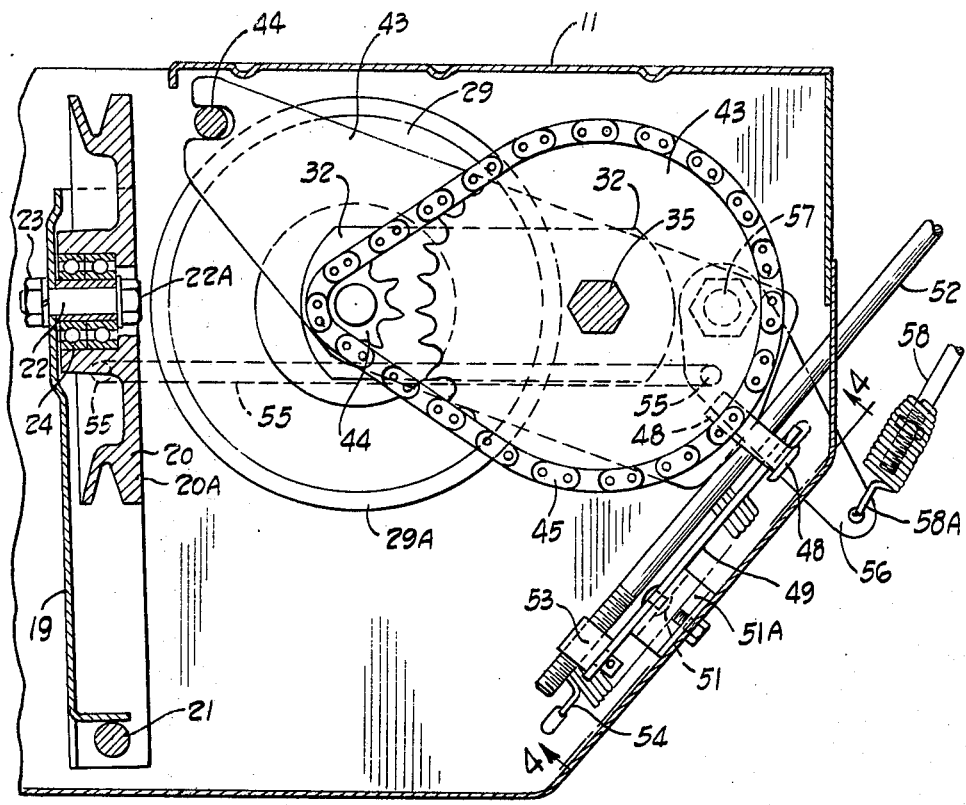
FIG. 3 is a view somewhat similar to that of FIG. 1, with some portions omitted for purposes of clarity of illustration, the parts in the view being shown in unclutched engagement.

The mechanism is de-clutched by tilting the plate 19 forwardly, by means of rod 55, lever arm 56, spring 58A and rod 58, to where the flat side 22A is moved away from the friction wheel 29 and thus discontinues driving of the described mechanism by the engine. No power is then delivered to the mechanism, and hence to the wheels 12 of the snow thrower, by this de-clutched condition of the parts as illustrated in FIG. 3 wherein the plate 19 is shown as tilted forwardly.

(In the herein discussion of speeds, it is to be understood that reference is not being made to absolute speeds but rather to speeds relative to the rotative speed of the driving wheel, which in turn depends on the speed of the engine on the snow thrower).

Upon moving the friction wheel 29, by the shifting bar 46 and actuating plate 49, toward the axis of the driving wheel 20, the rotative speed of the friction wheel decreases, which in turn decreases the rotative speed of the wheels 12 of the snow thrower. Upon the friction wheel 29 being shifted by the shifting bar 46 and actuating plate 49 to a location, as shown in FIG. 1, aligned with the axis of the driving wheel 20 the rim 29A is then in engagement with the end surface area 22A of the pintle 22, that is with the end surface of the head of bolt 22 forming the pintle.

The pintle or bolt 22 does not rotate on its axis and so there is no driving rotation of the friction wheel 29 by the interengagement of the rim 29A with the end surface 22A. In this location of the friction wheel 29, the driving mechanism is in neutral. The shafts, gears and chains of the mechanism are not moved and the wheels 12 of the snow thrower are not rotatively driven. The engagement of rim 29A with the stationary or non-rotating head of bolt 22 assures clear neutrality and an absence of "hunting" or shifting between forward and rearward direction when the friction wheel is approximately at the axis of wheel 20. Furthermore, by this arrangement of having the rim 29A engaging a stationary surface when aligned with the axis of wheel 20, the material of rim 29A is protected against being torn or stressed by frictional engagement tending to move the rim 29A in opposite directions, that is to move the rim 29A both in a forward and rearward direction. The shape, friction characteristics, and condition of the rim 29A are retained and preserved over a longer period of time than would otherwise exist without this unique feature.

In FIG. 2, the letter "F" indicates the location of the friction wheel (shown in full lines) where maximum relative speed forwardly is obtained; the letter "N" indicates the location where the friction wheel would be (and were it is shown to be in FIG. 1) where no speed and no direction of drive is obtained (that is when the mechanism is in "neutral"); and the letter "R" indicates the location of the friction wheel (shown in broken lines) where reverse direction of drive is obtained. Because it is usual and desired to have reverse drive at a lower relative speed than for forward drives, the location of the friction wheel at "R" is closer to the axis of the wheel 20 than is the location of the friction wheel at "F" indicated in full lines in FIG. 2, as being closest to the outer periphery of wheel 20.

The locations of "F", "N" and "R" for the friction wheel 29 in FIG. 2 correspond to the locations of "F", "N" and "R" for the actuating plate in FIG. 4.

The mechanism described and shown provides an efficient and economical structure for obtaining a variable speed drive, shiftable between different directions, as described in connection with a snow thrower. It is also appreciable to other driven devices, such as tractors, agricultural tillers, mowers, and other appliances wherein its functions are useful.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a variable speed power transmission mechanism for delivering power from an engine to a working part, the mechanism having a driving wheel rotatable by the engine, a friction wheel engageable with the driving wheel to be driven in accordance with the then current location of the engagement of the friction wheel with the driving wheel, the friction wheel being carried on a shaft rotatable with the friction wheel, the working part being operatively connected to a driven shaft, to be rotated by the same, said driven shaft having a non-cylindrical outer surface, the improvement of a first bearing assembly rotatably carrying said friction wheel carrying shaft, a second bearing assembly having an inner part non-rotatively engaging said driven shaft and longitudinally slidable along said driven shaft and having an outer part concentrically mounted about said inner part to permit the inner part and said driven shaft to rotate within the said outer part, supporting means connected to both said first bearing assembly and the outer part of said second bearing assembly to support the same and to maintain their respective axes parallel to each other, driving connection means inter-connecting said friction wheel carrying shaft and said driven shaft to provide for rotation of the driven shaft by the friction wheel, shifting means connected to said supporting means for shifting said supporting means along a path parallel to the axis of said first bearing assembly and said second bearing assembly, the shifting of said supporting means changing the location of the friction wheel relative to the axis of said driving wheel while maintaining the driving connection between said friction wheel carrying shaft and said driven shaft at varying shiftable positions of the first bearing assembly and second bearing assembly.

2. The improvement claimed in claim 1 and in which the said driving connection means inter-connecting the friction wheel and the driven shaft comprises gears and an endless chain connecting the gears.

3. The improvement claimed in claim 1 and in which said supporting means include an arm and in which the shifting means is operatively connected to said arm.

* * * * *